United States Patent [19]

Yamanaka et al.

[11] Patent Number: 4,859,516

[45] Date of Patent: Aug. 22, 1989

[54] MAT CONSISTING OF FILAMENT LOOP AGGREGATIONS AND METHOD AND APPARATUS FOR PRODUCING THE SAME

[75] Inventors: Minoru Yamanaka, Tokyo; Tetsuo Amawa, Kasukabe, both of Japan

[73] Assignee: Kabushiki Kaisha Risuron, Tokyo, Japan

[21] Appl. No.: 180,533

[22] Filed: Apr. 12, 1988

[30] Foreign Application Priority Data

Feb. 9, 1988 [JP] Japan .................................. 63-26837

[51] Int. Cl.$^4$ ............................................. B32B 33/00
[52] U.S. Cl. .................................. 428/92; 264/178 F; 428/95; 428/96; 428/218; 428/222; 428/286; 428/287; 428/288; 428/296
[58] Field of Search ....................... 428/85, 92, 95, 96, 428/218, 222, 286, 287, 288, 296; 264/178 F

[56] References Cited

U.S. PATENT DOCUMENTS

| Re. 27,614 | 4/1973 | Brunner et al. | 428/95 |
| 3,481,821 | 12/1969 | Brunner et al. | 428/95 |
| 3,837,988 | 9/1974 | Hennen et al. | 428/95 |

*Primary Examiner*—Marion C. McCamish
*Attorney, Agent, or Firm*—Ladas & Parry

[57] ABSTRACT

In this mat consisting of filament loop aggregations, the filament loop aggregations wherein irregular form loops are formed in the upright direction by respectively winding to be coil-like many filaments coarse in the arranging intervals and made of a thermoplastic synthetic resin and are fused in the intersecting parts are overlapped above and below an intermediate filament loop aggregation layer high in the filament density and formed of coiled loops in the partly or all laterally fallen direction.

8 Claims, 1 Drawing Sheet

MAT CONSISTING OF FILAMENT LOOP AGGREGATIONS AND METHOD AND APPARATUS FOR PRODUCING THE SAME

BACKGROUND OF THE INVENTION

This invention relates to a coarse net-like developed resilient mat made by complicatedly entangling synthetic resin monofilaments and more particularly to a mat consisting of filament loop aggregations and adapted to a porch mat of fixed dimensions or a floor mat formed and laid in a long sheet and a method and apparatus for producing the same.

Instead of a conventional carpet mat or synthetic resin mat, there is recently provided a three-dimensional net-like mat consisting of synthetic resin monofilaments high in the water permeability and quick dryability. Due to such characteristics as the resiliency and weather-proofness, such three-dimensional net-like mat is used in many indoor and outdoor fields, is applied particularly to such water using place as, for example, an inlet and outlet of a bath room or a pool side and is appreciated because it is simple to wash and dry.

Also, as this kind of three-dimensional mat is open, the sand and gravels brought when it is trod will drop down and will not remain on the surface. As water or the like also will drop down, the surface can be always kept dry. It is thus convenient.

In addition, when such elastic sheet as a synthetic resin sheet, foaming sheet or rubber sheet is pasted to the lower surface of such mat, the cushioning property as of a mat will be able to be increased, the sand and water dropping from the surface will be able to be received by this sheet pasted to the lower surface and the floor will be able to be prevented from being made dirty directly by the dropping sand and the like.

DESCRIPTION OF THE PRIOR ART

As disclosed in the gazette of a Japanese patent publication No. 14347/1972, such three-dimensional net-like mat is formed as a non-woven fabric wherein many monofilaments made of a thermoplastic synthetic resin are laminated while being rubbed and bend, are fused at their contact points and are cooled to be solidified.

The formation of upright loops disclosed in the gazette of a Japanese patent publication No. 31222/1980 and a Japanese patent laid open No. 85061/1987 is known as a web forming means of the above mentioned filaments in such non-woven fabric.

Now, in the non-woven fabric formation by the above described conventional means, in such rubbed and bent web formation, the resiliency of the individual rubber and bent filament form part itself is low, the rubbed and bent filaments by this producing means overlap on each other to fall down and, as a result, as the entangled density of the filaments becomes higher, the resiliency of the sheet will be lost.

Thus, when the mat is used, the treading touch will be obstructed and, when the mat is stored or carried, it will be difficult to wind in the sheet-like mat, much to the inconvenience.

On the other hand, when the web formation is made loop-like, the resiliency of the filament itself in each loop-like part will be developed but, in the web made of arcuate loops arranged in a substantially fixed form, the respective loops are only fused at their intersecting points and the contact points between the adjacent loops, are high in the independency and are therefore low in the resiliency against treading and, as a result, no favorable treading touch will be obtained.

SUMMARY OF THE INVENTION

Therefore, the present invention has it as an object to provide a mat wherein a filament web is formed of positively closed loops to develop a filament resiliency in each loop part and the degree of the contact fusing between the respective loops is made high to be able to develop a strong sheet resiliency and a method and apparatus for producing the same.

DESCRIPTION OF THE DRAWINGS

The many advantages and features of the present invention can be best understood and appreciated by reference to the accompanying drawings wherein.

DETAILED DESCRIPTION OF THE INVENTION

Figure 1:
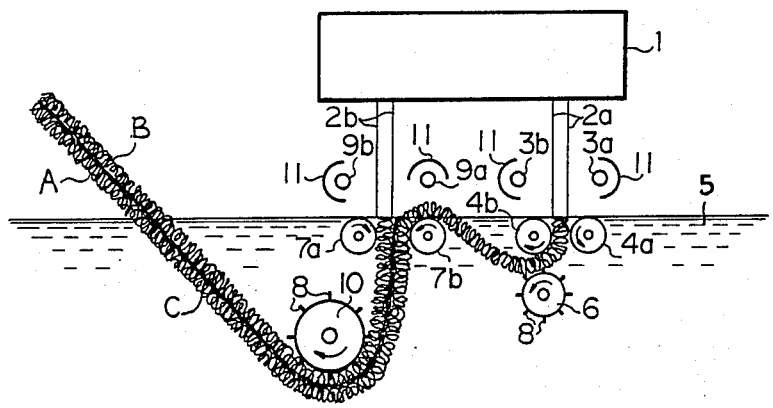
FIG. 1 is a side view of an essential part showing an embodiment of the apparatus of the present invention.

In order to attain such object, according to the present invention, a mat consists of upright disarranged loop-like synthetic resin filament three-dimensional aggregations and has many spaces within it to develop a cushioning property.

There is suggested a mat of a multilayer structure wherein are overlapped aggregations each having coiled loops formed in the upright direction on both front and back sides by intermediately holding a high filament density aggregation layer of coiled loops overlapped in the laterally fallen direction.

In order to form such mat, several hot filaments of a thermoplastic synthetic resin are pressed and extruded through T-die orifices and are made to fall toward a water surface.

A pair of guide rollers are set as opposed to each other below a water surface and a bundle of the above mentioned filaments is lowered so as to drop between these rollers.

The falling hot filaments are heated by such heat sources as ceramic far infrared ray heaters so as not to be cooled by the atmosphere.

Such hot filaments are easy to make coiled loops on the water surface. Unless the filaments are hot, the loops will become large. Further, in the filaments of a reduced temperature, no coiled loop will be formed but only a channeled rubbed and bent form will be able to be made.

The height from the die mouth end to the water surface is 5 to 100 cm. and the heat reduction of the filaments is prevented by making the die mouth end approach the water surface as much as possible.

The orifice diameter of the T-die is 0.3 to 1.5 mm. as an element determining the filament diameter, retains the resiliency and durability of the formed filaments and prevents the permanent set.

A mat sheet consisting of filament aggregations of respective widths can be made by arranging the numbers of orifices corresponding to the widths of 90, 120 and 150 cm. of intended mat sheets with an orifice arrangement of a T-die of 3 to 6 longitudinal rows at the intervals of 3 to 5 mm. and a pitch of 3 to 5 mm. in the lateral row.

That is to say, a hot filament bundle extruded out of the T-die of such orifice arrangement is made to fall upright toward cooling water and is received by submerged rolls of a rotary peripheral speed well slower than the falling speed to limit the falling speed in water and to give the filaments a resistance toward the water surface from the above mentioned rolls. Loops having a peripheral length of a filament length corresponding to the difference between the extruding speed of the respective filaments and the falling speed in water will be sequentially continuously formed to be coil-like on the water surface by this resistance.

At this time, in order to make it easy to form loops and to make bent irregular loops, it is effective to keep boiling the cooling water surface between the inclined panels.

This boiling state vibrates the respective filaments wound on the water surface. As a result, entangled disarranged coiled loops are induced on the water surface.

In order to make the boiling state on the water surface between the inclined guide panels, it is important to keep the filaments coming out of the T-die at a high temperature until the liquid level. Generally, when the filaments are in contact with the atmosphere, the filament temperature will quickly reduce. The water surface heated by the falling in water of the filament bundle kept at a filament extruding molding temperature of 200° to 150° C. by the above mentioned heating treatment to prevent air cooling in the filaments coming out of the T-die will be in the boiling state. Therefore, when the cooling water is kept at a high temperature of 60° to 80° C., this boiling will be made positive.

When the filaments are molded to be coiled loops while kept at a high temperature, the fusing between the loops will be accelerated. Further, when the cooling water is at a high temperature, in case the molded loops are pulled out into the atmosphere by the guide rolls and are sent to the secondary process, they will be able to be easily dried with cool or hot air.

A filament loop aggregation in which the coil density is made coarse by increasing the rotation (pulling speed in water) of the rolls in water and is made high by reducing the pulling speed is formed.

On the other hand, even if the thickness width of the hanging filament bundle is not regulated, a three-dimensional formation of a coiled loop will be able to be made. However, the size of the loop formed on the liquid surface is not fixed. Therefore, a means of regulating the thickness width of the filament bundle functions effectively to make uniform coiled loop aggregations of an intended thickness.

As the pair of guide rollers are just below the water surface and regulate the positions of the filaments having sunk while describing loops, the thickness width of the filament bundle in the water surface position just above them will be regulated as related with the regulation below the water surface.

Such filament loop aggregations are made in two parallel places and the other aggregation is formed along one side surface of one aggregation.

In such formation, when the above mentioned one aggregation is heated on the side surface to be about the fusing temperature, the filaments of the side surface will soften and will form an aggregation layer high in the filament density by the lateral fall of loops.

In molding synthetic resins, the general temperature as of the cooling bath is about 50° C. for PE (polyethylene) and PP (polypropylene), about 10° to 40° C. for PVC (polyvinyl chloride) and about 85° C. for PS (polystyrene).

The surface tension of water on PVC (polyvinyl chloride) is so high as to be about 60 to 70 dym./cm. that fine filaments of an outside diameter less than 1 mm. will be overlapped in turn above the water surface, the coiled loops formed here will be laminated in several steps and will be cooled in water and therefore the object aggregations coarse in the loop clearances will not be obtained. Therefore, in order to sequentially sink the coiled loops on the surface, it is effective to add a surface active agent reducing the surface tension of the cooling bath.

EMBODIMENTS

FIG. 1 is a side view showing component parts in an optimum apparatus for embodying the present invention. Respectively two filaments 2a and 2b are to lower vertically toward cooling water 5 while being molded in the thickness direction (longitudinal direction) in separate positions from a T-die 1 extruding a thermoplastic synthetic resin material under pressure.

In the lateral direction (front to back direction on the paper surface) of the T-die in this case, many filaments 2a and 2b are to be molded as arranged at predetermined intervals (pitch of 3 to 5 mm.) in a length range corresponding to the lateral width of an intended molding.

In the falling zone of these filaments 2a and 2b, barlike ceramic far infrared ray heaters 3a and 3b are arranged on both sides of the respective filament bundles so as to be heating heat sources.

In the filament 2a falling zone, just below the water surface, a pair of guide rollers 4a and 4b are arranged at a predetermined spacing so that the bundle of the above mentioned filaments 2a may fall on the water surface in this clearance and may be led by these rollers 4a and 4b to sink.

Also, a feeding roller 6 rotated and driven at a constant speed is arranged in water so that the bundle of the filaments 2a having sunk in the above mentioned water may be moved in the cooling water 5 as held between it and the above mentioned guide roller 4b. As many engaging pins 8 are erected at intervals on the peripheral surface of this roller 6 in water and the rotary peripheral speed of the roller 6 rotating at a constant speed is set at a speed lower than the falling speed of the filaments 2a, the filaments 2a falling from the T-die 1 at a high speed will be decelerated in sinking in water by the above mentioned roller 6 in the water and will be, as a result, relaxed by the filament length corresponding to the difference between these falling speed and sinking speed. These relaxations will concentrate in the water surface zone due to the buoyancy of the filaments 2 of a small specific gravity. As a result, the filaments 2a will form loops on the water surface.

That is to say, the filaments 2a extruded out of the T-die will reach the water surface of the cooling water 5 while being kept near the temperature at the time of molding by heating by the above mentioned heaters 3a in the falling zone in air. The filaments 2a having sunk in the cooling water 5 will quickly lower in the temperature and will be hardened. However, these hardened filaments 2a will be regulated in the pulling amounts by the submerged rollers 6 stopped in sliding by the engaging pins 8, therefore the hardened parts in water will be subjected to resistances from the submerged roller 6 and thereby the soft filaments 2a still at a high temperature just before reaching the water surface will be curved and will be gradually pulled into water while describing loops to form coil-like loops.

When the temperature within the bath of this cooling water 5 is kept at 60° to 80° C., the cooling water 5 in the falling position will be locally boiled by heating by the filaments 2a reaching the water surface while at a high temperature. By this boiling, the water surface of that part will be waved and greatly rocked and therefore the filaments 2 describing loops on this water surface will be waved and disarranged in response to the rocking of the water surface.

Therefore, the disturbed form loops will be prevented by the concavo-convexes by the disarrangement from the total surface contact between the adjacent loops overlapped on the water surface and will have comparatively many contact point parts.

In such contact part, the loops will be fused with each other between them and will be cooled to be hardened. Therefore, coiled loops having comparatively many fused parts between the adjacent loops will be continuously formed in turn and a filament loop aggregation A in which coiled loops are cross-linked longitudinally and laterally with the loop edges overlapping between the adjacent filaments 2 will be formed.

With the above formation as a first filament loop aggregation forming step, the aggregation A moving in the above mentioned cooling water 5 will be engaged with a guide roller 7b of a pair of guide rollers 7a and 7b arranged just below the water surface in the falling zone of the other filament 2b and will be pulled up so as to be exposed at least on one surface above the water surface.

A ceramic far infrared ray heater 9a is arranged in the exposed position of this aggregation A so that the aggregation A may be dried and heated on the surface to be near the fusing temperature while moving. Therefore, the loops near this heated surface will soften in the filaments and will overlap as laterally fallen to form a filament loop layer C high in the filament density and will be further softened and fused on the surface. This aggregation A will detour the guide roller 7b and will be again pulled into the cooling water 5. Filaments 2b hang down between the above mentioned heated surface and the other guide roller 7a in this pulling zone.

Further, another submerged roller 10 is arranged in the water sinking zone of the filaments 2b. The filament bundle is moved at a low speed while engaged with the engaging pins 8 on the peripheral surface of the roller 10. As the moving speed of the filament bundle in water is made lower than the falling speed of the filaments 2b falling down from the T-die, the same as in the above described first filament loop aggregation forming step, an aggregation B in which irregular loops on the water surface are formed to be coil-like will be obtained. 9b represents a heating ceramic far infrared ray heater present in the falling zone of the filaments 2b. 11 represents a reflecting plate.

When this aggregation B molding step is made a second filament loop aggregation molding step, in this second step, the aggregation B will be fused and connected on one side with the heated surface of the above mentioned aggregation A.

Figure 2:
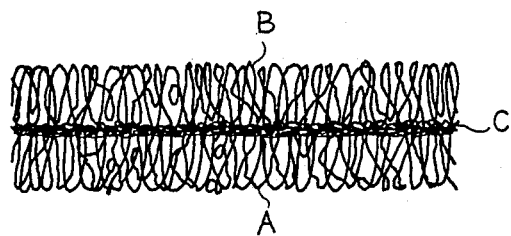
FIG. 2 is a side view showing an example of the mat of the present invention.

Therefore, the product formed under cooling in water through the above mentioned step is a mat of an overlapped structure of the aggregations A and B consisting of vertically upright loops holding in the center between them an aggregation layer C of laterally fallen direction loops as shown in FIG. 2.

By the way, the means of forming the above mentioned aggregation layer C is not limited to be as in the above illustrated embodiment. For example, a separately formed aggregation layer C consisting of laterally fallen loops may be bonded to the aggregation A or B formed of loops in the upright direction. Each of the guide rollers 4a, 4b and 9a, 9b may be arranged so as to be exposed on a part of the peripheral surface above the water surface.

By the way, in order to pull the coiled loops formed on the cooling water surface into water without disturbing their form, a surface active agent is added into cooling water 4.

| Amounts of addition of the surface active agents per 100 parts of water: | |
| --- | --- |
| Anionic system: | |
| Alkylbenzenesulfonate: | 1 to 0.2 part |
| Dialkylsulfosuccinate: | 1 to 0.05 part |
| Noninonic system: | |
| Polyoxyethylene nonylphenol ether: | 1 to 0.1 part |

It is effective to add 0.05 to 0.2% dialkylsulfosuccinate which is high in the capacity of reducing the surface tension and in the connecting effect with a slight amount.

Now, in this kind of apparatus, in order to keep the cooling bath level constant, cooling water is circulated with a pump while being overflowed. In such case, many bubbles will be generated in an auxiliary tank level detecting electrode and cooling bath and will be disadvantageous in molding. In this respect, at the above mentioned effective component concentration of the dialkylsulfosuccinate, many bubbles tend to be generated. Therefore, it can be said to be optimum to add and use preferably 0.05 to 0.2% dialkylsulfosuccinate.

The mat material consisting of the thus formed filament loop aggregations A and B may be coated with a plastisol made of the same material mixture as of the filament to prevent the bonding strength reduction and permanent set of the filament loops.

A back sheet B consisting of a resin sheet, foamed sheet or rubber sheet may be used as bonded to the back surface of the mat material in response to the object of use of the product.

(Formation Example 1)

| | |
| --- | --- |
| Polyvinyl chloride (PVC) (P-1300) | 100 parts |
| Plasticizer DOP Dioctyl phthalate | 50 parts |
| Stabilizer Dibutyl tin laurate | 2 parts |
| Stabilizer Cadmium stearate | 0.6 part |
| Stabilizer Barium stearate | 0.4 parts |
| Coloring agent | 0.1 parts |

A compound material of the above mentioned mixture is molded to be filaments by an extruding molder.

The distance between the guide rollers 4a and 4b below the cooling water surface is set to be 8 mm. The distance between the guide roller 4b and submerged roller 6 is 9 mm. The distance between the other guide rollers 7a and 7b is 16 mm. The filament molding orifice diameter is 0.8 mm. The T-die orifice arrangement is of two longitudinal rows at the intervals of 5 mm. and a lateral orifice pitch of 5 mm.

The distance between the T-die and cooling water surface is 5 cm. The die temperature is 185° C. The cooling water temperature is 60° to 80° C. Four ceramic far infrared ray heaters of 1.5 KW each are used. At a molding linear speed of 2 m. per minute, loops at a speed of 40 cm. per minute can be made.

In this formation, by only holding the filament bundle in its thickness width direction with the guide rollers, the front and back surfaces of the aggregations can be uniformed and the mat shown in FIG. 2 is obtained and is made a product through drying and bonding steps.

As the extruder die pressure is applied and hot filaments are extruded into air, the finished dimension of the filament is 0.2 mm. thicker than the filament orifice of a diameter of 0.8 mm. of the T-die and a filament coil structure of a diameter of 1 mm. is made. Even if the distance between the guide rollers 7a and 7b is set to be 16 mm., the aggregation molded under the width regulation by this distance will shrink when the filament is hardened and will be therefore 13.5 to 14 mm. thick.

(Effects of the Invention)

Thus, according to the mat of the present invention, as an aggregation is formed of irregular form loops by winding filaments to be coil-like, the individual closed loops well develop the filament resiliency, are of such irregular form as a wavy form and are therefore high in the degree of contact fusing between the adjacent continuous coiled loops and between the filament forming loops arranged longitudinally and laterally and thus a mat high in the bonded degree as a whole can be obtained. In the aggregation part in which such loops are formed in the upright direction, in addition to the resiliency of the above mentioned loops themselves, a stiff mat resiliency can be obtained by the strength of the bonded degree between these loops. The aggregation layer high in the filament density is high in the strength, particularly, in the tensile strength, is so high in the clogged degree as to allow sand or water to drop from the upper part of the mat and, on the other hand, to prevent it from springing up from the lower surface. Therefore, the mat of the present invention of doubly overlapped filament loop aggregations with such aggregation layer held between them is so high in the resiliency and tensile strength as to be optimum to be used for a porch mat or floor sheet very high in the treading touch.

When the diameter of the filament in this case is set to be in the range mentioned in claim 2, the practical strength of the filament loop can be obtained and, on the other hand, the mat can be made high in the sheet weight convenient to the setting work and in the treading touch.

When the major diameter of the loop of an irregular form is adjusted to be in the range mentioned in claim 3, it will be effective in keeping the mat elasticity but, on the other hand, if the major diameter of the loop is too large, a shoe tip or like will catch on and cut the loop and such danger as falling down will be likely to be caused. Thus, it is not preferable.

In the method of forming a mat or sheet consisting of such filament loop aggregations, the filaments are lowered onto the water surface while near the molding temperature and, when this water surface is waved by boiling, the loops formed on the water surface will be able to be in such irregular forms as wavy forms and to be contact-fused in the loop intersecting parts and between the loops.

In addition, there are auxiliary effects that, when the filament bundle falling toward the cooling water surface is regulated in the direction of contracting from outside the width of the thickness direction of the bundle, the sizes of the respective loops formed of these filaments will be able to be uniformed and, when the contracted width is controlled, the formation of combining the above described upright direction loops and laterally fallen loops will be able to be freely made.

If the distance from the T-die to the cooling water surface is long, the filament temperature will be reduced by air cooling between them. Therefore, it is desirable to set the distance to be as short as possible. However, if they are too adjacent, the loop formation on the water surface will be disturbed. Therefore, this distance of 5 to 10 cm. is effective.

By keeping the temperature of the cooling water at a comparatively high temperature of 60° to 80° C., a local boiling state in which the water surface on which the filaments fall is properly waved by heating by the filaments submerging into water can be automatically obtained. In order to smoothly sink the filaments to prevent the loop forms from being disturbed, it is effective to add a surface active agent.

What is claimed is:

1. A mat consisting of filament loop aggregations wherein the filament loop aggregations in which irregular form loops are formed in the upright direction by respectively winding to be coil-like many filaments coarse in the arranging intervals and made of a thermoplastic synthetic resin and are fused in the intersecting parts are overlapped above and below an intermediate filament loop aggregation layer high in the filament density and formed of coiled loops in the partly or all laterally fallen direction.

2. A mat consisting of filament loop aggregations according to claim 1 wherein the diameter of said filament is in the range of 0.3 to 1.5 mm.

3. A mat consisting of filament loop aggregations according to claim 1 wherein the major diameter of said loop is in the range of 3 to 15 mm.

4. A method of producing a mat consisting of filament loop aggregations characterized in that, between the first filament loop aggregation forming step wherein many filaments arranged at intervals longitudinally and laterally are continuously molded by extruding a thermoplastic synthetic resin out of a T-die, are present on a cooling water surface boiling as kept by heating at a filament temperature close to the temperature at the time of molding while this filament bundle is vertically lowered toward the cooling water surface and are sunk in the vertical direction as controlled to be at a speed lower than the extruding molding speed of these filaments and the second filament loop aggregation forming step progressing simultaneously with the first step, the aggregation processed in said first step is once pulled up on the water surface, is fed into the filament bundle falling water surface zone in said second step while being heated on one side surface near to the fusing temperature and is formed by making said heated surface a loop forming surface on one side of the filament bundle in said second step.

5. A method of producing a mat consisting of filament loop aggregations according to claim 4 wherein the distance from the lower surface of the T-die to the water surface is in the range of 5 to 10 cm.

6. A method of producing a mat consisting of filament loop aggregations according to claim 4 wherein cooling water held at a temperature of 60° to 80° C. is locally boiled by heating by sinking loops just below the fall of said filaments.

7. A method of producing a mat consisting of filament loop aggregations according to claim 4 wherein about 0.05 to 0.2% surface active agent dialkylsulfosuccinate is added into cooling water.

8. A method of producing a mat consisting of filament loop aggregations according to claim 4 wherein about 0.05 to 0.2% surface active agent dialkylsulfosuccinate is added into cooling water.

* * * * *